(12) United States Patent
Jeon et al.

(10) Patent No.: US 11,226,206 B2
(45) Date of Patent: Jan. 18, 2022

(54) ELECTRONIC APPARATUS AND METHOD FOR IMPLEMENTING SIMULTANEOUS LOCALIZATION AND MAPPING (SLAM)

(71) Applicants: LG Electronics Inc., Seoul (KR); Korea Advanced Institute of Science and Technology, Daejeon (KR)

(72) Inventors: Kyeongjin Jeon, Seoul (KR); Hyukjung Lee, Daejeon (KR); Joohwan Chun, Daejeon (KR); Sungjoo Kim, Seoul (KR)

(73) Assignees: LG Electronics Inc., Seoul (KR); Korea Advanced Institute of Science and Technology, Daejeon (KR)

( * ) Notice: Subject to any disclaimer, the term of this patent is extended or adjusted under 35 U.S.C. 154(b) by 112 days.

(21) Appl. No.: 16/703,137

(22) Filed: Dec. 4, 2019

(65) Prior Publication Data
US 2021/0055114 A1    Feb. 25, 2021

(30) Foreign Application Priority Data
Aug. 21, 2019   (KR) .................. 10-2019-0102360

(51) Int. Cl.
G01C 21/32    (2006.01)

(52) U.S. Cl.
CPC ................. *G01C 21/32* (2013.01)

(58) Field of Classification Search
CPC ....................................... G01C 21/32
USPC .......................................... 702/5
See application file for complete search history.

(56) References Cited

U.S. PATENT DOCUMENTS

| | | | | |
|---|---|---|---|---|
| 8,676,498 B2* | 3/2014 | Ma | ......... | G01C 21/165 701/426 |
| 2016/0070265 A1* | 3/2016 | Liu | ......... | G05D 1/0088 701/3 |
| 2020/0109954 A1* | 4/2020 | Li | ......... | G05D 1/0274 |

* cited by examiner

*Primary Examiner* — Ricky Go
(74) *Attorney, Agent, or Firm* — Fish & Richardson P.C.

(57) ABSTRACT

A method of calculating a moving distance of a movable object in consideration of a bias identified based on a linear velocity of the movable object in the process of implementing a SLAM, and an electronic apparatus therefor are provided. One or more of an electronic apparatus, a vehicle and an autonomous vehicle disclosed in the present invention may be connected to an artificial intelligence module, a drone (Unmanned Aerial Vehicle, UAV), a robot, an augmented reality (AR) device, a virtual reality (VR) device, a device related to 5G service, and so on.

16 Claims, 9 Drawing Sheets

FIG. 5

① $\Delta s_{k,\text{True}} = \Delta s_k$ - First bias value         $\Delta s_k = vt_{cycle}$ ← Linear velocity of movable object $\Delta \theta_{k,\text{True}} = \Delta \theta_k$ - Second bias value     $\Delta \theta_k = wt_{cycle}$ → Moving time ← Rotational angular velocity of movable object ② $\underbrace{\begin{bmatrix} x_{k+1} \\ y_{k+1} \\ \theta_{k+1} \end{bmatrix}}_{X_{k+1}} = f(X_k, \Delta s_{k,\text{True}}, \Delta \theta_{k,\text{True}}) = \begin{bmatrix} x_k + \Delta s_{k,\text{True}} \cos\left(\theta_k + \dfrac{\Delta \theta_{k,\text{True}}}{2} + \dfrac{\pi}{2}\right) \\ y_k + \Delta s_{k,\text{True}} \sin\left(\theta_k + \dfrac{\Delta \theta_{k,\text{True}}}{2} + \dfrac{\pi}{2}\right) \\ \theta_k + \Delta \theta_{k,\text{True}} \end{bmatrix}$

FIG. 6

① $\Delta s_{k,\text{True}} = \Delta s_k + w_{\Delta s,k} - \boxed{\mu_k \Delta s_{k,\text{True}}}$ ~ 610

$\Delta \theta_{k,\text{True}} = \Delta \theta_k + w_{\Delta \theta,k} - \boxed{b_{\Delta \theta,k}}$ ~ 620

② $\underbrace{\begin{bmatrix} x_{k+1} \\ y_{k+1} \\ \theta_{k+1} \\ \mu_{k+1} \\ b_{\Delta\theta,k+1} \end{bmatrix}}_{X_{k+1}} = f(X_k, \Delta s_{k,\text{True}}, \Delta \theta_{k,\text{True}}) = \begin{bmatrix} x_k + \Delta s_{k,\text{True}} \cos\left(\theta_k + \frac{\Delta \theta_{k,\text{True}}}{2} + \frac{\pi}{2}\right) \\ y_k + \Delta s_{k,\text{True}} \sin\left(\theta_k + \frac{\Delta \theta_{k,\text{True}}}{2} + \frac{\pi}{2}\right) \\ \theta_k + \Delta \theta_{k,\text{True}} \\ \mu_k \\ b_{\Delta\theta,k} \end{bmatrix}$

FIG. 7

① $\Delta s_{k,\text{True}} = \Delta s_k + w_{\Delta s,k} - \boxed{a_{\Delta s,k}}$ ~710

$\Delta \theta_{k,\text{True}} = \Delta \theta_k + w_{\Delta \theta,k} - \boxed{b_{\Delta \theta,k}}$ ~720

② $\underbrace{\begin{bmatrix} x_{k+1} \\ y_{k+1} \\ \theta_{k+1} \\ a_{\Delta s,k+1} \\ b_{\Delta \theta,k+1} \end{bmatrix}}_{X_{k+1}} = f(X_k, \Delta s_{k,\text{True}}, \Delta \theta_{k,\text{True}}) = \begin{bmatrix} x_k + \Delta s_{k,\text{True}} \cos\left(\theta_k + \dfrac{\Delta \theta_{k,\text{True}}}{2} + \dfrac{\pi}{2}\right) \\ y_k + \Delta s_{k,\text{True}} \sin\left(\theta_k + \dfrac{\Delta \theta_{k,\text{True}}}{2} + \dfrac{\pi}{2}\right) \\ \theta_k + \Delta \theta_{k,\text{True}} \\ a_{\Delta s,k} \\ b_{\Delta \theta,k} \end{bmatrix}$

ELECTRONIC APPARATUS AND METHOD FOR IMPLEMENTING SIMULTANEOUS LOCALIZATION AND MAPPING (SLAM)

CROSS-REFERENCE TO RELATED APPLICATION

This application is based on and claims priority under 35 U.S.C. § 119(a) to Korean Patent Application No. 10-2019-0102360, filed on Aug. 21, 2019, the disclosure of which is incorporated herein in its entirety by reference.

BACKGROUND

1. Field

The present disclosure relates to a method and an electronic apparatus for implementing a SLAM. More specifically, the present disclosure relates to a method of calculating a moving distance of a movable object in consideration of a bias identified based on a linear velocity of the movable object in the process of implementing a SLAM, and an electronic apparatus therefor.

2. Description of the Related Art

SLAM (Simultaneous Localization and Mapping) refers to a work of creating a map of the surrounding environment of a movable object while measuring the position of the movable object, and interest in such a SLAM is increasing. There is also a need to implement such SLAM more effectively.

In addition, the autonomous vehicle refers to a vehicle equipped with an autonomous driving device capable of recognizing the vehicle status and the environment around the vehicle and controlling the driving of the vehicle accordingly. As research on autonomous vehicles progresses, studies on various services that can increase user convenience using autonomous vehicles are also in progress.

SUMMARY

Disclosed embodiments disclose a method and an electronic apparatus of implementing a SLAM. The objective of the present embodiment is not limited to the above-mentioned, and other objectives can be deduced from the following embodiments.

A method of implementing a SLAM (Simultaneous Localization and Mapping) according to an embodiment of the present invention may comprise acquiring information on a linear velocity and a rotational angular velocity of a movable object; calculating a moving distance and a rotation angle of the movable object based on the acquired information; and updating state information for the SLAM based on the moving distance and the rotation angle of the movable object, and the calculating may include calculating the moving distance of the movable object in consideration of a first bias identified based on the linear velocity of the movable object.

According to another embodiment, an electronic apparatus implementing a SLAM may comprise a memory having at least one program stored thereon; and a processor configured to acquire information on a linear velocity and a rotational angular velocity of a movable object, calculate a moving distance and a rotation angle of the movable object based on the acquired information, and update state information for the SLAM based on the moving distance and the rotation angle of the movable object by executing the at least one program, and the processor may calculate the moving distance of the movable object in consideration of a first bias identified based on the linear velocity of the movable object.

According to a yet another embodiment, a vehicle implementing a SLAM may comprise a sensor configured to measure a linear velocity and a rotational angular velocity of the vehicle; and an electronic apparatus configured to acquire information on the linear velocity and the rotational angular velocity of the vehicle from the sensor, calculate a moving distance and a rotation angle of the vehicle based on the acquired information, and update state information for the SLAM based on the moving distance and the rotation angle of the vehicle, and the electronic apparatus may calculate the moving distance of the vehicle in consideration of a first bias identified based on the linear velocity of the vehicle.

A computer-readable non-volatile recording medium according to a yet another aspect may include a non-volatile recording medium having a program for executing the above-described method on a computer recorded thereon.

Specific details of other embodiments are included in the detailed description and the drawings.

According to the present disclosure, the electronic apparatus may calculate the moving distance of the movable object from which the bias is removed by using a bias value proportional to the linear velocity of the movable object, thereby calculating the moving distance of the movable object more accurately. Therefore, the electronic apparatus can update the state information for the SLAM more accurately through the more accurate moving distance of the movable object.

In addition, the electronic apparatus may include at least one of a bias value with respect to the moving distance of the movable object and a bias value with respect to the rotation angle of the movable object in the state information for the SLAM, and repeatedly update at least one of the bias values included in the state information. As a result, the bias that can be changed can be modeled more accurately, and the moving distance and the rotation angle of the movable object can be calculated more accurately in result.

The advantageous effects of the invention are not limited to the above-mentioned, and other advantageous effects which are not mentioned can be clearly understood by those skilled in the art from the claims.

BRIEF DESCRIPTION OF THE DRAWINGS

The above and other aspects, features, and advantages of certain embodiments will be more apparent from the following detailed description taken in conjunction with the accompanying drawings, in which:

FIG. 5 illustrates an embodiment in which a processor calculates a moving distance and a rotation angle of a movable object in consideration of a bias and updates state information for a SLAM.

FIG. 6 illustrates another embodiment in which a processor calculates a moving distance and a rotation angle of a movable object in consideration of a bias and updates state information for a SLAM.

FIG. 7 illustrates a yet another embodiment in which a processor calculates a moving distance and a rotation angle of a movable object in consideration of a bias and updates state information for a SLAM.

DETAILED DESCRIPTION

Figure 1:
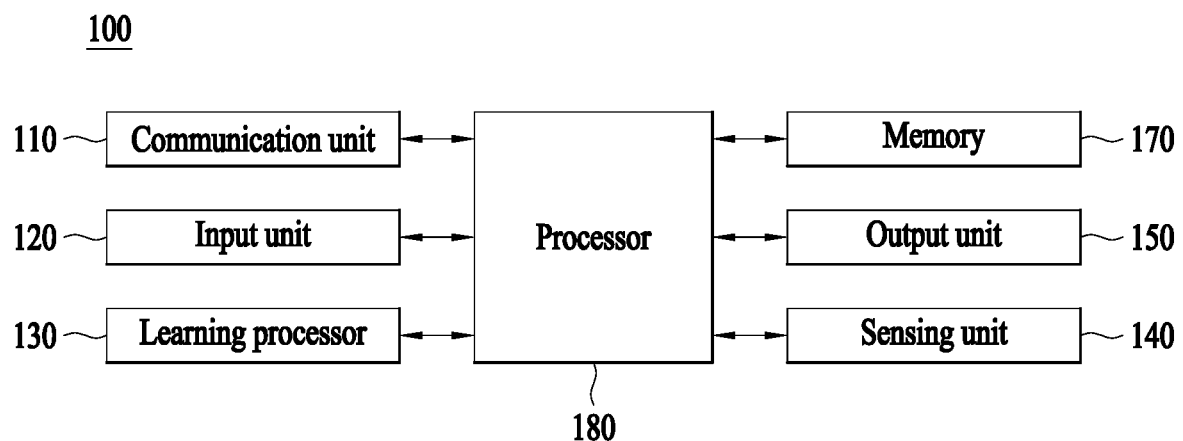
FIG. 1 illustrates an AI device according to an embodiment.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The terms used in the embodiments are selected, as much as possible, from general terms that are widely used at present while taking into consideration the functions obtained in accordance with the present disclosure, but these terms may be replaced by other terms based on intentions of those skilled in the art, customs, emergency of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

In addition, in this specification, "artificial Intelligence (AI)" refers to the field of studying artificial intelligence or a methodology capable of making the artificial intelligence, and "machine learning" refers to the field of studying methodologies that define and solve various problems handled in the field of artificial intelligence. The machine learning is also defined as an algorithm that enhances performance for a certain operation through a steady experience with respect to the operation.

An "artificial neural network (ANN)" may refer to a general model for use in the machine learning, which is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output the value of an activation function concerning signals input through the synapse, weights, and deflection thereof.

The model parameters refer to parameters determined by learning, and include weights for synaptic connection and deflection of neurons, for example. Then, hyper-parameters refer to parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks is also called deep learning, and the deep learning is a part of the machine learning. In the following description, the machine learning is used as a meaning including the deep learning.

In addition, in this specification, a vehicle may be an autonomous vehicle. "Autonomous driving" refers to a self-driving technology, and an "autonomous vehicle" refers to a vehicle that performs driving without a user's operation or with a user's minimum operation. In addition, the autonomous vehicle may refer to a robot having an autonomous driving function.

For example, autonomous driving may include all of a technology of maintaining the lane in which a vehicle is driving, a technology of automatically adjusting a vehicle speed such as adaptive cruise control, a technology of causing a vehicle to automatically drive in a given route, and a technology of automatically setting a route, along which a vehicle drives, when a destination is set.

Here, a vehicle may include all of a vehicle having only an internal combustion engine, a hybrid vehicle having both an internal combustion engine and an electric motor, and an electric vehicle having only an electric motor, and may be meant to include not only an automobile but also a train and a motorcycle, for example.

In the following description, embodiments of the present disclosure will be described in detail with reference to the drawings so that those skilled in the art can easily carry out the present disclosure. The present disclosure may be embodied in many different forms and is not limited to the embodiments described herein.

Hereinafter, embodiments of the present disclosure will be described in detail with reference to the drawings.

FIG. 1 illustrates an AI device 100 according to an embodiment of the present disclosure.

AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 1, AI device 100 may include a communication unit 110, an input unit 120, a learning processor 130, a sensing unit 140, an output unit 150, a memory 170, and a processor 180, for example.

Communication unit 110 may transmit and receive data to and from external devices, such as other AI devices 100a to 100e and an AI server 200, using wired/wireless communication technologies. For example, communication unit 110 may transmit and receive sensor information, user input, learning models, and control signals, for example, to and from external devices.

At this time, the communication technology used by communication unit 110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 120 may acquire various types of data.

At this time, input unit 120 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 120 may acquire, for example, input data to be used when acquiring an output using learning data for model learning and a learning model. Input unit 120 may acquire unprocessed input data, and in this case, processor 180 or learning processor 130 may extract an input feature as pre-processing for the input data.

Learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 130 may perform AI processing along with a learning processor 240 of AI server 200.

At this time, learning processor 130 may include a memory integrated or embodied in AI device 100. Alternatively, learning processor 130 may be realized using memory 170, an external memory directly coupled to AI device 100, or a memory held in an external device.

Sensing unit 140 may acquire at least one of internal information of AI device 100 and surrounding environmental information and user information of AI device 100 using various sensors.

At this time, the sensors included in sensing unit 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LIDAR, and a radar, for example.

Output unit 150 may generate, for example, a visual output, an auditory output, or a tactile output.

At this time, output unit 150 may include, for example, a display that outputs visual information, a speaker that outputs auditory information, and a haptic module that outputs tactile information.

Memory 170 may store data which assists various functions of AI device 100. For example, memory 170 may store input data acquired by input unit 120, learning data, learning models, and learning history, for example.

Processor 180 may determine at least one executable operation of AI device 100 based on information determined or generated using a data analysis algorithm or a machine learning algorithm. Then, processor 180 may control constituent elements of AI device 100 to perform the determined operation.

To this end, processor 180 may request, search, receive, or utilize data of learning processor 130 or memory 170, and may control the constituent elements of AI device 100 so as to execute a predictable operation or an operation that is deemed desirable among the at least one executable operation.

At this time, when connection of an external device is necessary to perform the determined operation, processor 180 may generate a control signal for controlling the external device and may transmit the generated control signal to the external device.

Processor 180 may acquire intention information with respect to user input and may determine a user request based on the acquired intention information.

At this time, processor 180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 130, may have learned by learning processor 240 of AI server 200, or may have learned by distributed processing of processors 130 and 240.

Processor 180 may collect history information including, for example, the content of an operation of AI device 100 or feedback of the user with respect to an operation, and may store the collected information in memory 170 or learning processor 130, or may transmit the collected information to an external device such as AI server 200. The collected history information may be used to update a learning model.

Processor 180 may control at least some of the constituent elements of AI device 100 in order to drive an application program stored in memory 170. Moreover, processor 180 may combine and operate two or more of the constituent elements of AI device 100 for the driving of the application program.

Figure 2:
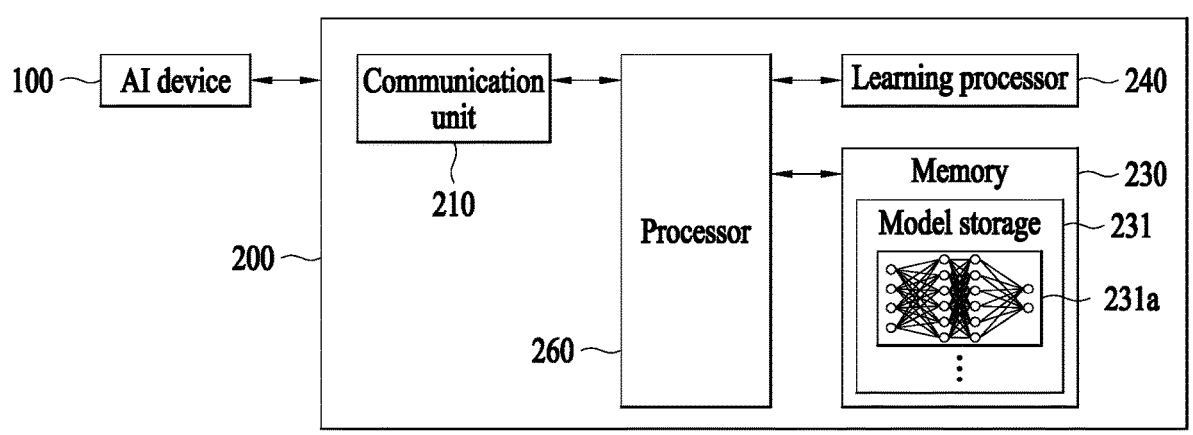
FIG. 2 illustrates an AI server according to an embodiment.

FIG. 2 illustrates AI server 200 according to an embodiment of the present disclosure.

Referring to FIG. 2, AI server 200 may refer to a device that causes an artificial neural network to learn using a machine learning algorithm or uses the learned artificial neural network. Here, AI server 200 may be constituted of multiple servers to perform distributed processing, and may be defined as a 5G network. At this time, AI server 200 may be included as a constituent element of AI device 100 so as to perform at least a part of AI processing together with AI device 100.

AI server 200 may include a communication unit 210, a memory 230, a learning processor 240, and a processor 260, for example.

Communication unit 210 may transmit and receive data to and from an external device such as AI device 100.

Memory 230 may include a model storage unit 231. Model storage unit 231 may store a model (or an artificial neural network) 231a which is learning or has learned via learning processor 240.

Learning processor 240 may cause artificial neural network 231a to learn learning data. A learning model may be used in the state of being mounted in AI server 200 of the artificial neural network, or may be used in the state of being mounted in an external device such as AI device 100.

The learning model may be realized in hardware, software, or a combination of hardware and software. In the case in which a part or the entirety of the learning model is realized in software, one or more instructions constituting the learning model may be stored in memory 230.

Processor 260 may deduce a result value for newly input data using the learning model, and may generate a response or a control instruction based on the deduced result value.

Figure 3:
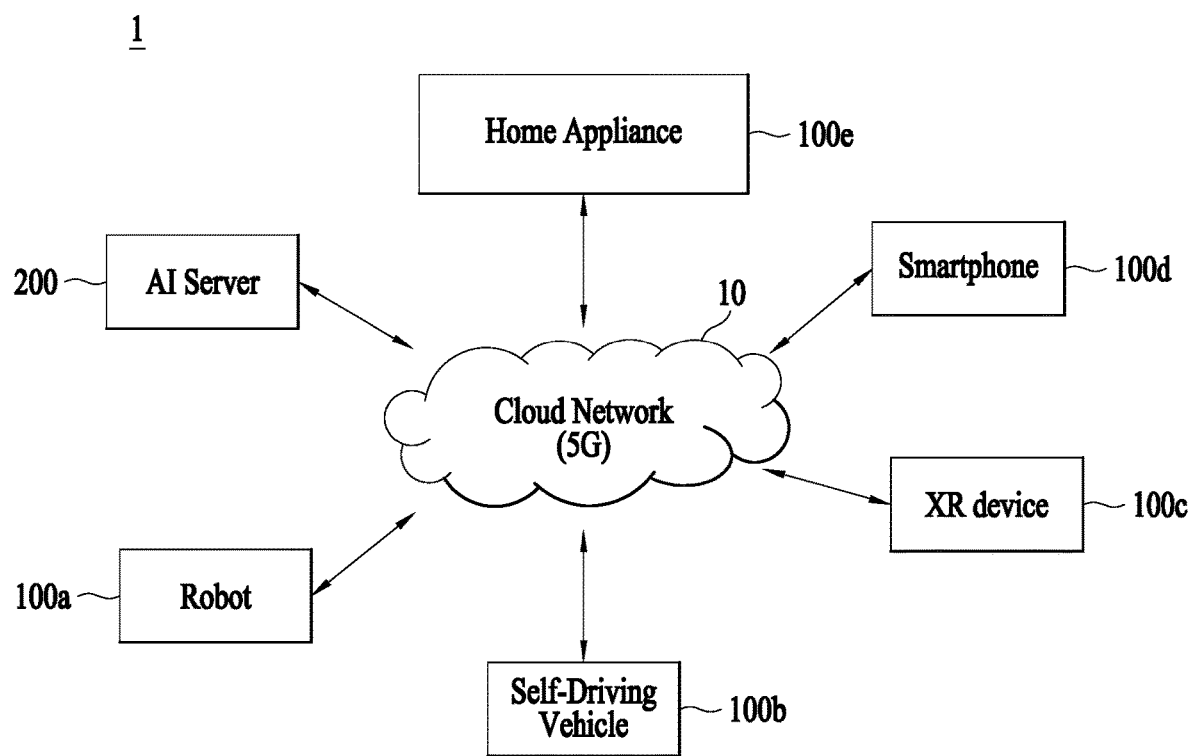
FIG. 3 illustrates an AI system according to an embodiment.

FIG. 3 illustrates an AI system 1 according to an embodiment of the present disclosure.

Referring to FIG. 3, in AI system 1, at least one of AI server 200, a robot 100a, a self-driving vehicle 100b, an XR device 100c, a smart phone 100d, and a home appliance 100e is connected to a cloud network 10. Here, robot 100a, self-driving vehicle 100b, XR device 100c, smart phone 100d, and home appliance 100e, to which AI technologies are applied, may be referred to as AI devices 100a to 100e.

Cloud network 10 may constitute a part of a cloud computing infra-structure, or may mean a network present in the cloud computing infra-structure. Here, cloud network 10 may be configured using a 3G network, a 4G or long term evolution (LTE) network, or a 5G network, for example.

That is, respective devices 100a to 100e and 200 constituting AI system 1 may be connected to each other via cloud network 10. In particular, respective devices 100a to 100e and 200 may communicate with each other via a base station, or may perform direct communication without the base station.

AI server 200 may include a server which performs AI processing and a server which performs an operation with respect to big data.

AI server 200 may be connected to at least one of robot 100a, self-driving vehicle 100b, XR device 100c, smart phone 100d, and home appliance 100e, which are AI devices constituting AI system 1, via cloud network 10, and may assist at least a part of AI processing of connected AI devices 100a to 100e.

At this time, instead of AI devices 100a to 100e, AI server 200 may cause an artificial neural network to learn according to a machine learning algorithm, and may directly store a learning model or may transmit the learning model to AI devices 100a to 100e.

At this time, AI server 200 may receive input data from AI devices 100a to 100e, may deduce a result value for the received input data using the learning model, and may generate a response or a control instruction based on the deduced result value to transmit the response or the control instruction to AI devices 100a to 100e.

Alternatively, AI devices 100a to 100e may directly deduce a result value with respect to input data using the learning model, and may generate a response or a control instruction based on the deduced result value.

Hereinafter, various embodiments of AI devices 100a to 100e, to which the above-described technology is applied, will be described. Here, AI devices 100a to 100e illustrated in FIG. 3 may be specific embodiments of AI device 100 illustrated in FIG. 1.

Self-driving vehicle 100b may be realized into a mobile robot, a vehicle, or an unmanned air vehicle, for example, through the application of AI technologies.

Self-driving vehicle 100b may include an autonomous driving control module for controlling an autonomous driving function, and the autonomous driving control module may mean a software module or a chip realized in hardware. The autonomous driving control module may be a constituent element included in self-driving vehicle 100b, but may be a separate hardware element outside self-driving vehicle 100b so as to be connected to self-driving vehicle 100b.

Self-driving vehicle 100b may acquire information on the state of self-driving vehicle 100b using sensor information acquired from various types of sensors, may detect (recognize) the surrounding environment and an object, may generate map data, may determine a movement route and a driving plan, or may determine an operation.

Here, self-driving vehicle 100b may use sensor information acquired from at least one sensor among a LIDAR, a radar, and a camera in the same manner as robot 100a in order to determine a movement route and a driving plan.

In particular, self-driving vehicle 100b may recognize the environment or an object with respect to an area outside the field of vision or an area located at a predetermined distance or more by receiving sensor information from external devices, or may directly receive recognized information from external devices.

Self-driving vehicle 100b may perform the above-described operations using a learning model configured with at least one artificial neural network. For example, self-driving vehicle 100b may recognize the surrounding environment and the object using the learning model, and may determine a driving line using the recognized surrounding environment information or object information. Here, the learning model may be directly learned in self-driving vehicle 100b, or may be learned in an external device such as AI server 200.

At this time, self-driving vehicle 100b may generate a result using the learning model to perform an operation, but may transmit sensor information to an external device such as AI server 200 and receive a result generated by the external device to perform an operation.

Self-driving vehicle 100b may determine a movement route and a driving plan using at least one of map data, object information detected from sensor information, and object information acquired from an external device, and a drive unit may be controlled to drive self-driving vehicle 100b according to the determined movement route and driving plan.

The map data may include object identification information for various objects arranged in a space (e.g., a road) along which autonomous driving vehicle 100b drives. For example, the map data may include object identification information for stationary objects, such as streetlights, rocks, and buildings, and movable objects such as vehicles and pedestrians. Then, the object identification information may include names, types, distances, and locations, for example.

In addition, self-driving vehicle 100b may perform an operation or may drive by controlling the drive unit based on user control or interaction. At this time, self-driving vehicle 100b may acquire interactional intention information depending on a user operation or voice expression, and may determine a response based on the acquired intention information to perform an operation.

Figure 4:
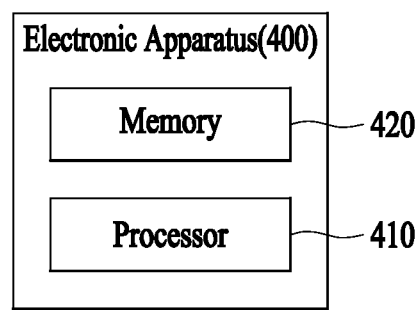
FIG. 4 illustrates an electronic apparatus according to the present disclosure.

FIG. 4 illustrates an electronic apparatus according to the present disclosure.

An electronic apparatus 400 includes a processor 410 and a memory 420. In electronic apparatus 400 shown in FIG. 4, only components relevant to the present embodiments are illustrated. Accordingly, it will be apparent to those skilled in the art that electronic device 400 may further include other general purpose components in addition to the components illustrated in FIG. 4.

Electronic apparatus 400 may implement a SLAM (Simultaneous Localization and Mapping). In other words, electronic apparatus 400 may recognize a location of a movable object and simultaneously generate a map of the surrounding environment of the movable object. In the process of implementing the SLAM, electronic apparatus 400 may set state information for the SLAM and may repeatedly update the state information through the probability filter. For example, the probability filter may be an Extended Kalman Filter. According to an embodiment, electronic apparatus 400 may be included in the movable object. The movable object may be a robot or a vehicle, but is not limited thereto and may also be another movable object.

Processor 410 controls overall function of electronic apparatus 400 for implementing the SLAM. For example, processor 410 generally controls electronic apparatus 400 by executing programs stored in memory 420 in electronic apparatus 400. Processor 410 may be implemented as a central processing unit (CPU), a graphics processing unit (GPU), an application processor (AP), etc. provided in electronic apparatus 400, but is not limited thereto.

Memory 420 is hardware for storing various data processed in electronic apparatus 400, and memory 420 may store data processed and data to be processed by electronic apparatus 400. Also, memory 420 may store applications, drivers, etc. to be driven by electronic apparatus 400. Memory 420 may include random access memory (RAM) such as dynamic random access memory (DRAM), static random access memory (SRAM), read-only memory (ROM), electrically erasable programmable read-only memory (EEPROM), CD-ROM, Blu-ray or other optical disk storage, hard disk drive (HDD), solid state drive (SSD), or flash memory.

Processor 410 may acquire information on a linear velocity and a rotational angular velocity of the movable object. Processor 410 may acquire information on the linear velocity and the rotational angular velocity of the movable object which are measured by sensors from the sensors. Specifically, an odometer sensor disposed on the movable object can measure the linear velocity of the movable object, and a yaw rate sensor disposed on the movable object can measure the rotational angular velocity of the movable object while the movable object is moving.

Processor 410 may calculate a moving distance and a rotation angle of the movable object based on the acquired information. Processor 410 may calculate the moving distance of the movable object based on the linear velocity of the movable object, and calculate the rotation angle of the movable object based on the rotational angular velocity of the movable object. Specifically, processor 410 may calculate the distance traveled by the movable object through an operation between the linear velocity of the movable object and the moving time of the movable object measured by the sensor and calculate the rotation angle of the movable object through an operation between the rotational angular velocity of the movable object and the moving time of the movable object measured by the sensor. In addition, processor 410 may calculate the moving distance and the rotation angle of the movable object in consideration of noise.

When calculating the moving distance of the movable object, processor 410 may calculate the moving distance of the movable object in consideration of a bias identified based on the linear velocity of the movable object. Specifically, processor 410 may set a bias value proportional to the linear velocity of the movable object using a preset proportional constant to mathematically model the bias proportional to the linear velocity of the movable object. Subsequently, processor 410 may calculate the moving distance of the movable object from which the bias is removed by subtracting the bias value from the moving distance of the movable object calculated based on the linear velocity of the movable object. In other words, processor 410 may estimate the actual moving distance of the movable object through the moving distance from which the bias is removed.

When calculating the rotation angle of the movable object, processor 410 may calculate the rotation angle of the movable object from which the bias is removed. Specifically, processor 410 may set a bias value using a preset constant to model the bias with respect to the rotation angle of the movable object. Subsequently, processor 410 may calculate the rotation angle of the movable object from which the bias is removed by subtracting the bias value from the rotation angle of the movable object calculated based on the rotational angular velocity of the movable object. In other words, processor 410 may estimate the actual rotation angle of the movable object through the rotation angle from which the bias is removed. The bias of the movable object with respect to the rotation angle may vary depending on the type of the movable object, the state of the movable object, and the passenger state in the movable object.

Processor 410 may update state information for the SLAM based on the moving distance and the rotation angle of the movable object. In other words, processor 410 may perform a prediction process, which is a process of the SLAM. The state information for the SLAM may include information on a location and a direction of the movable object and information on locations of the recognized landmarks. Therefore, processor 410 may update the information on the location and the direction of the movable object and the locations of the landmarks based on the moving distance and the rotation angle of the movable object.

The state information for the SLAM may include the information on the location and the direction of the movable object and information on the bias value set for modeling the bias with respect to the moving distance of the movable object. According to an embodiment, information on the bias value with respect to the moving distance of the movable object may include information on the proportional constant of the bias value. Accordingly, processor 410 may update the information on the location and the direction of the movable object and the information on the bias value with respect to the moving distance of the movable object based on the moving distance and the rotation angle of the movable object. In addition, as the SLAM may be an EKF-SLAM, processor 410 may update the state information through extended Kalman filter. Further, processor 410 may generate a Jacobian matrix for the EKF-SLAM based on the state information, and repeatedly update the state information through the Jacobian matrix.

The state information for the SLAM may include the information on the location and the direction of the movable object, information on the bias value set for modeling the bias with respect to the moving distance of the movable object, and information on the bias value set for modeling the bias with respect to the rotation angle of the movable object. Accordingly, processor 410 may update the information on the location and the direction of the movable object, information on the bias value set for modeling the bias with respect to the moving distance of the movable object, and information on the bias value set for modeling the bias with respect to the rotation angle of the movable object based on the moving distance and the rotation angle of the movable object.

A bias may occur when the linear velocity of the movable object is measured by the sensor, and this bias may be proportional to the linear velocity of the movable object. In other words, as the linear velocity of the movable object increases, the bias may also increase. In addition, the bias proportional to the linear velocity of the movable object may be reflected in the moving distance of the movable object calculated based on the linear velocity. Therefore, electronic apparatus 400 may calculate the moving distance of the movable object from which the bias is removed using the bias value proportional to the linear velocity of the movable object, thereby calculating the moving distance of the movable object more accurately. Accordingly, electronic apparatus 400 may more accurately update the state information for the SLAM with the more accurate moving distance of the movable object.

In addition, electronic apparatus 400 may include at least one of the bias value with respect to the moving distance of the movable object and the bias value with respect to the rotation angle of the movable object to the state information for the SLAM and repeatedly update the at least bias value included in the state information thereby more accurately modeling changeable bias. In result, it is possible to more accurately calculate the moving distance and the rotation angle of the movable object.

FIG. 5 illustrates an embodiment in which a processor calculates a moving distance and a rotation angle of a movable object in consideration of a bias and updates state information for a SLAM.

A processor 410 may calculate a moving distance $\Delta s_k$ of a movable object based on the measured linear velocity v of the movable object and moving time $t_{cycle}$ of the movable object. In addition, processor 410 may calculate a rotation angle $\Delta \theta_k$ of the movable object based on the measured rotational angular velocity w of the movable object and moving time $t_{cycle}$ of the movable object.

Processor 410 may calculate the moving distance $\Delta s_{k,True}$ of the movable object from which a bias is removed by subtracting a first bias value from the calculated moving distance $\Delta s_k$ of the movable object. In addition, processor 410 may calculate the rotation angle $\Delta \theta_{k,True}$ of the movable object from which a bias is removed by subtracting a second bias value from the calculated rotation angle $\Delta \theta_k$ of the movable object.

Processor 410 may set the first bias value proportional to the linear velocity of the movable object using a predetermined proportional constant. Also, processor 410 may set the second bias value using a predetermined constant.

According to an example, processor 410 may set the first bias value according to Equation 1 below. Specifically, processor 410 may set the first bias value calculated through the proportional constant $\mu_k$, measured linear velocity v and moving time $t_{cycle}$.

$$\text{First bias value} = \mu_k \times v \times t_{cycle} \quad \text{[Equation 1]}$$

According to another example, processor 410 may set the first bias value according to Equation 2 below. Specifically, processor 410 may set the first bias value calculated through the proportional constant $\mu_k$ and the moving distance $\Delta s_{k,True}$ of the movable object from which a bias is removed.

$$\text{First bias value} = \mu_k \times \Delta s_{k,True} \quad \text{[Equation 2]}$$

Processor 410 may update state information for a SLAM based on the moving distance $\Delta s_{k,True}$ of the movable object from which a bias is removed and the rotation angle $\Delta \theta_{k,True}$ of the movable object from which a bias is removed. Specifically, processor 410 may update a state vector for the SLAM from the state vector $X_k$ of kth time point to the state vector $X_{k+1}$ of (k+1)th time point based on the moving distance $\Delta s_{k,True}$ of the movable object from which a bias is removed and the rotation angle $\Delta \theta_{k,True}$ of the movable object from which a bias is removed. Here, the kth state vector $X_k$ may include coordinates $(x_k, y_k)$ and direction $\theta_k$ of the movable object.

FIG. 6 illustrates another embodiment in which a processor calculates a moving distance and a rotation angle of a movable object in consideration of a bias and updates state information for a SLAM.

A processor 410 may calculate the moving distance $\Delta s_{k,True}$ of the movable object from which a bias is removed by subtracting a first bias value 610 from the moving distance $\Delta s_k$ of the movable object calculated based on the measured linear velocity of the movable object. Here, the first bias value 610 may be set by a multiplication operation of a proportional constant $\mu_k$ and the moving distance $\Delta s_{k,True}$ from which a bias is removed. In FIG. 6, $w_{\Delta s,k}$ and $w_{\Delta \theta,k}$ represent Gaussian noises.

Processor 410 may calculate the rotation angle $\Delta \theta_{k,True}$ of the movable object from which a bias is removed by subtracting a second bias value 620 from the rotation angle $\Delta \theta_k$ of the movable object calculated based on the measured rotational angular velocity of the movable object. Here, the second bias value 620 may be set as $b_{\Delta \theta,k}$, which is a constant that can be updated.

Processor 410 may update a state vector for the SLAM from the state vector $X_k$ of kth time point to the state vector $X_{k+1}$ of (k+1)th time point based on the moving distance $\Delta s_{k,True}$ of the movable object from which a bias is removed and the rotation angle $\Delta \theta_{k,True}$ of the movable object from which a bias is removed. Here, the kth state vector $X_k$ may not only include coordinates $(x_k, y_k)$ and direction $\theta_k$ of the movable object, but may also include $\mu_k$, which is the proportional constant of the first bias value 610, and $b_{\Delta \theta,k}$, which is the second bias value 620. Accordingly, since the proportional constant of the first bias value 610 and the second bias value 620 may be repeatedly updated, processor 410 may calculate the moving distance and the rotation angle of the movable object more accurately.

FIG. 7 illustrates a yet another embodiment in which a processor calculates a moving distance and a rotation angle of a movable object in consideration of a bias and updates state information for a SLAM.

A processor 410 may calculate the moving distance $\Delta s_{k,True}$ of the movable object from which a bias is removed by subtracting a first bias value 710 from the moving distance $\Delta s_k$ of the movable object calculated based on the measured linear velocity of the movable object. Here, the first bias value 710 may be set as $\alpha_{\Delta s,k}$, which is a constant that can be updated. In FIG. 7, $w_{\Delta s,k}$ and $w_{\Delta \theta,k}$ represent Gaussian noises.

Processor 410 may calculate the rotation angle $\Delta \theta_{k,True}$ of the movable object from which a bias is removed by subtracting a second bias value 720 from the rotation angle $\Delta\theta_k$ of the movable object calculated based on the measured rotational angular velocity of the movable object. Here, the second bias value 720 may be set as $b_{\Delta\theta,k}$, which is a constant that can be updated.

Processor 410 may update a state vector for the SLAM from the state vector $X_k$ of kth time point to the state vector $X_{k+1}$ of (k+1)th time point based on the moving distance $\Delta s_{k,True}$ and the rotation angle $\Delta\theta_{k,True}$ of the movable object from which biases are removed. Here, the kth state vector $X_k$ may not only include coordinates ($x_k$, $y_k$) and direction $\theta_k$ of the movable object, but may also include $\alpha_{\Delta s,k}$, which is the first bias value 710, and $b_{\Delta\theta,k}$, which is the second bias value 720. Accordingly, since the proportional constant of the first bias value 710 and the second bias value 720 may be repeatedly updated, processor 410 may calculate the moving distance and the rotation angle of the movable object more accurately.

Figure 8:
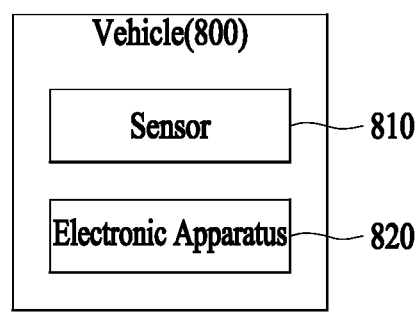
FIG. 8 illustrates a vehicle according to the present disclosure.

FIG. 8 illustrates a vehicle according to the present disclosure.

A vehicle 800 may include a sensor 810 and an electronic apparatus 820. In vehicle 800 shown in FIG. 8, only components relevant to the present embodiments are illustrated. Accordingly, it will be apparent to those skilled in the art that other general purpose components may further be included in addition to the components illustrated in FIG. 8.

Vehicle 800 may be an autonomous vehicle.

Sensor 810 may measure a linear velocity and a rotational angular velocity of vehicle 800. According to an embodiment, sensor 810 includes an odometer sensor, and the linear velocity of the movable object may be measured through the odometer sensor. In addition, sensor 810 includes a yaw rate sensor, and the rotational angular velocity of the movable object may be measured through the yaw rate sensor. Further, sensor 810 may include a GPS (Global Positioning System), an IMU (Inertial Measurement Unit), a RADAR unit, a LIDAR unit, and a camera, through which status of vehicle 800 or the surrounding environment of vehicle 800 may be sensed.

Electronic apparatus 820 may acquire information on the linear velocity and the rotational angular velocity of vehicle 800 from sensor 810, calculate the moving distance and the rotation angle of vehicle 800 based on the acquired information, and update state information for a SLAM based on the moving distance and the rotation angle of vehicle 800. In addition, electronic apparatus 820 may calculate the moving distance of vehicle 800 in consideration of the bias identified based on the linear velocity of vehicle 800 when calculating the moving distance of vehicle 800. Electronic apparatus 820 may correspond to electronic apparatus 400 of FIGS. 4 to 7, and thus duplicated descriptions thereof will be omitted.

Figure 9:
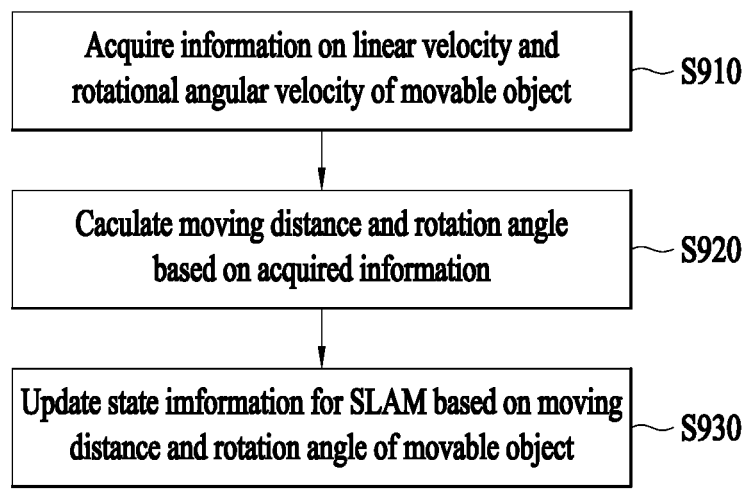
FIG. 9 is a diagram for explaining a method in which an electronic apparatus implements a SLAM.

FIG. 9 is a diagram for explaining a method in which an electronic apparatus implements a SLAM.

The method shown in FIG. 9 may be performed by each component of electronic apparatus 400 of FIGS. 4 to 7, and thus duplicated descriptions thereof will be omitted.

In step S910, electronic apparatus 400 may acquire information on the linear velocity and rotational angular velocity of the movable object. Specifically, electronic apparatus 400 may acquire the information on the linear velocity of the movable object through a measurement by an odometer sensor and may acquire the information on the rotational angular velocity of the movable object through a measurement by a yaw rate sensor.

In step S920, electronic apparatus 400 may calculate the moving distance and the rotation angle of the movable object based on the information acquired in step S910. Electronic apparatus 400 may calculate the moving distance of the movable object based on the linear velocity of the movable object and may calculate the rotation angle of the movable object based on the rotational angular velocity of the movable object.

When calculating the moving distance of the movable object, electronic apparatus 400 may calculate the moving distance of the movable object in consideration of a bias identified based on the linear velocity of the movable object. Specifically, electronic apparatus 400 may set a bias value proportional to the linear velocity of the movable object using a predetermined proportional constant to mathematically model the bias proportional to the linear velocity of the movable object. Subsequently, electronic apparatus 400 may calculate the moving distance of the movable object from which the bias is removed by subtracting the bias value from the moving distance of the movable object calculated based on the linear velocity of the movable object. In other words, electronic apparatus 400 may estimate the actual moving distance of the movable object through the moving distance of the movable object from which the bias is removed.

When calculating the rotation angle of the movable object, electronic apparatus 400 may calculate the rotation angle of the movable object from which a bias is removed. Specifically, electronic apparatus 400 may set a bias value using a predetermined constant to model the bias with respect to the rotation angle of the movable object. Subsequently, electronic apparatus 400 may calculate the rotation angle of the movable object from which the bias is removed by subtracting the bias value from the rotation angle of the movable object calculated based on the rotational angular velocity of the movable object.

In step S930, electronic apparatus 400 may update state information for a SLAM based on the moving distance and the rotation angle of the movable object.

The state information for the SLAM may include information on a location and a direction of the movable object, information on the bias value set for modeling the bias with respect to the moving distance of the movable object, and information on the bias value set for modeling the bias with respect to the rotation angle of the movable object. Therefore, electronic apparatus 400 may update the information on the location and the direction of the movable object, the information on the bias value set for modeling the bias with respect to the moving distance of the movable object, and the information on the bias value set for modeling the bias with respect to the rotation angle of the movable object based on the moving distance and the rotation angle of the movable object. Also, the SLAM may be an EKF-SLAM, and electronic apparatus 400 may repeatedly update the state information through an extended Kalman filter.

The apparatus described above may comprise a processor, a memory for storing program data and executing it, a permanent storage such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable recording medium. Examples of the computer readable recording medium include magnetic storage media (e.g., ROM, RAM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

The present embodiment may be described in terms of functional block components and various processing steps. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the present disclosure may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for Simultaneous Localization and Mapping (SLAM), comprising:
   acquiring a linear velocity and a rotational angular velocity of a movable object;
   calculating a moving distance and a rotation angle of the movable object based at least on the acquired linear velocity and the acquired rotational angular velocity, respectively, the calculating comprising:
      calculating the moving distance of the movable object further based on a first bias associated with the moving distance; and
      based on the calculated moving distance and rotation angle of the movable object, updating state information usable by SLAM,
   wherein calculating the moving distance and the rotation angle of the movable object based at least on the acquired linear velocity and the acquired rotational angular velocity comprises:
      calculating a first bias value based on (1) a first proportionality constant for modeling the first bias and (2) the linear velocity of the movable object; and
      calculating the moving distance by subtracting the first bias value from the moving distance of the movable object calculated based on the linear velocity.

2. The method of claim 1, wherein the state information comprises location information and direction information of the movable object, and information associated with the first proportionality constant.

3. The method of claim 1, wherein calculating the moving distance and the rotation angle of the movable object based at least on the acquired linear velocity and the acquired rotational angular velocity comprises:
   calculating a second bias value based on a second constant for modeling a second bias associated with the rotation angle of the movable object; and
   calculating the rotation angle of the movable object by subtracting the second bias value from the rotation angle of the movable object calculated based on the rotational angular velocity, and
   wherein the state information comprises location information and direction information of the movable object, information associated with the first proportionality constant, and information associated with the second constant.

4. The method of claim 1, wherein the linear velocity of the movable object is acquired from an odometer sensor disposed on the movable object, and
   wherein the rotational angular velocity of the movable object is acquired from a yaw rate sensor disposed on the movable object.

5. The method of claim 1, wherein the updating comprises:
   updating the state information using an Extended Kalman Filter.

6. A non-volatile computer-readable medium storing instructions which, when executed by at least one processor, causes the at least one processor to perform the method of claim 1.

7. A method for Simultaneous Localization and Mapping (SLAM), comprising:
   acquiring a linear velocity and a rotational angular velocity of a movable object;
   calculating a moving distance and a rotation angle of the movable object based at least on the acquired linear velocity and the acquired rotational angular velocity, respectively, the calculating comprising:
      calculating the moving distance of the movable object further based on a first bias associated with the moving distance; and
      based on the calculated moving distance and rotation angle of the movable object, updating state information usable by SLAM,
   wherein the calculating comprises:
      calculating a first bias value based on a first constant for modeling the first bias associated with the moving distance of the movable object;
      calculating the moving distance based on the first bias value;
      calculating a second bias value based on a second constant for modeling a second bias associated with the rotation angle of the movable object; and
      calculating the rotation angle based on the second bias value, and
   wherein the state information comprises location information and direction information of the movable object, information associated with the first bias value, and information associated with the second bias value.

8. The method of claim 7, wherein calculating the moving distance based on the first bias value comprises:
   subtracting the first bias value from the moving distance of the movable object calculated based on the linear velocity, and
   wherein calculating the rotation angle based on the second bias value comprises:

subtracting the second bias value from the rotation angle of the movable object calculated based on the rotational angular velocity.

9. An apparatus implementing Simultaneous Localization and Mapping (SLAM), the apparatus comprising:
   at least one processor; and
   a non-volatile computer-readable medium coupled to the at least one processor having stored thereon instructions which, when executed by the at least one processor, causes the at least one processor to perform operations comprising:
      acquiring a linear velocity and a rotational angular velocity of a movable object;
      calculating a moving distance and a rotation angle of the movable object based at least on the acquired linear velocity and the acquired rotational angular velocity, respectively, the calculating comprising:
         calculating the moving distance of the movable object further based on a first bias associated with the moving distance; and
         based on the calculated moving distance and rotation angle of the movable object, updating state information usable by SLAM,
   wherein calculating the moving distance and the rotation angle of the movable object based at least on the acquired linear velocity and the acquired rotational angular velocity comprises:
      calculating a first bias value based on (1) a first proportionality constant for modeling the first bias and (2) the linear velocity of the movable object; and
      calculating the moving distance by subtracting the first bias value from the moving distance of the movable object calculated based on the linear velocity.

10. The apparatus of claim 9, wherein the state information comprises location information and direction information of the movable object, and information associated with the first proportionality constant.

11. The apparatus of claim 9, wherein the calculating the moving distance and the rotation angle of the movable object based at least on the acquired linear velocity and the acquired rotational angular velocity comprises:
   calculating a second bias value based on a second constant for modeling a second bias associated with the rotation angle of the movable object; and
   calculating the rotation angle of the movable object by subtracting the second bias value from the rotation angle of the movable object calculated based on the rotational angular velocity, and
   wherein the state information comprises location information and direction information of the movable object, information associated with the first proportionality constant, and information associated with the second constant.

12. The apparatus of claim 9, wherein the linear velocity of the movable object is acquired from an odometer sensor disposed on the movable object, and
   wherein the rotational angular velocity of the movable object is acquired from a yaw rate sensor disposed on the movable object.

13. The apparatus of claim 9, wherein the updating comprises:
   updating the state information using an Extended Kalman Filter.

14. A vehicle implementing Simultaneous Localization and Mapping (SLAM), the vehicle comprising:
   a sensor configured to measure a linear velocity and a rotational angular velocity of the vehicle; and
   the apparatus of claim 9,
   wherein the movable object is the vehicle.

15. An apparatus implementing Simultaneous Localization and Mapping (SLAM), the apparatus comprising:
   at least one processor; and
   a non-volatile computer-readable medium coupled to the at least one processor having stored thereon instructions which, when executed by the at least one processor, causes the at least one processor to perform operations comprising:
      acquiring a linear velocity and a rotational angular velocity of a movable object;
      calculating a moving distance and a rotation angle of the movable object based at least on the acquired linear velocity and the acquired rotational angular velocity, respectively, the calculating comprising:
         calculating the moving distance of the movable object further based on a first bias associated with the moving distance; and
         based on the calculated moving distance and rotation angle of the movable object, updating state information usable by SLAM,
   wherein the calculating comprises:
      calculating a first bias value based on a first constant for modeling the first bias associated with the moving distance of the movable object;
      calculating the moving distance based on the first bias value;
      calculating a second bias value based on a second constant for modeling a second bias associated with the rotation angle of the movable object; and
      calculating the rotation angle based on the second bias value, and
   wherein the state information comprises location information and direction information of the movable object, information associated with the first bias value, and information associated with the second bias value.

16. The apparatus of claim 15, wherein the calculating the moving distance based on the first bias value comprises:
   subtracting the first bias value from the moving distance of the movable object calculated based on the linear velocity, and
   wherein the calculating the rotation angle based on the second bias value comprises:
   subtracting the second bias value from the rotation angle of the movable object calculated based on the rotational angular velocity.

* * * * *